United States Patent [19]

McLeod et al.

[11] Patent Number: 5,456,022
[45] Date of Patent: Oct. 10, 1995

[54] BATCH-TYPE SLUDGE DRIER

[75] Inventors: David P. McLeod, Muskegon; David J. Spyker, Holland; Daniel De Haan; Greg De Haan, both of Zeeland; Wesley G. Koops, Holland; James E. Roelofs, Zeeland, all of Mich.

[73] Assignee: JWI, Inc., Holland, Mich.

[21] Appl. No.: 256,638

[22] PCT Filed: Jan. 13, 1992

[86] PCT No.: PCT/US92/00397

§ 371 Date: Jul. 13, 1994

§ 102(e) Date: Jul. 13, 1994

[87] PCT Pub. No.: WO93/13842

PCT Pub. Date: Jul. 22, 1993

[51] Int. Cl.⁶ ..................................... F27D 15/02
[52] U.S. Cl. .................. 34/77; 34/471; 34/474; 34/477; 34/468; 34/76; 34/78; 34/73
[58] Field of Search ................... 34/73, 76, 77, 34/78, 468, 469, 470, 474, 475, 476, 477

[56] References Cited

U.S. PATENT DOCUMENTS

| | | |
|---|---|---|
| 942,150 | 12/1909 | Tiemann . |
| 1,295,259 | 2/1919 | Beebee . |
| 2,349,249 | 5/1944 | Desetti et al. . |
| 4,043,051 | 8/1977 | Lussenden .................. 34/77 |
| 4,134,216 | 1/1979 | Stevens ...................... 34/77 |
| 4,196,526 | 4/1980 | Berti ........................... 34/77 |
| 4,432,147 | 2/1984 | Chen et al. ................. 34/46 |
| 4,532,720 | 8/1985 | Uchida ....................... 34/27 |
| 4,837,945 | 6/1989 | Wulf et al. ................. 34/77 |
| 5,119,571 | 6/1992 | Beasley ..................... 34/26 |

FOREIGN PATENT DOCUMENTS

9100341 U  1/1992  Germany .

Primary Examiner—Henry A. Bennet
Assistant Examiner—Siddharth Ohri
Attorney, Agent, or Firm—Flynn, Thiel, Boutell & Tanis

[57] ABSTRACT

A drier having a boxlike housing (12) for receiving a hopper (13) therein which contains a batch of wet sludge. The hopper (13) cooperates with the housing, when closed therein, to define a closed air recirculation system which supplies dry pressurized warm air into an air-receiving chamber (79) located at the bottom of the hopper. The air passes upwardly through a perforated bottom wall (78) into and through the sludge to remove moisture therefrom. The moist air passes upwardly through the open top of the hopper, through a filter and is supplied to a drying unit (34) located in the housing for removing moisture therefrom, which moisture is externally discharged. The drying unit resupplies the dry air back to the drying chamber formed in the hopper.

9 Claims, 8 Drawing Sheets

5,456,022

BATCH-TYPE SLUDGE DRIER

FIELD OF THE INVENTION

This invention relates to an improved batch-type drying apparatus for wet materials and particularly sludgelike materials.

BACKGROUND OF THE INVENTION

Numerous apparatus have been developed for drying wet sludgelike materials, such as metal hydroxide sludge as generated in plating operations and the like. Such apparatus, of both the batch and continuous type, often employ heaters and/or agitators to reduce the drying time as a heating fluid, normally air, is circulated therethrough. While these known apparatus have operated in a reasonably satisfactory manner, nevertheless there is an ongoing need for improvements in such drying apparatus which improve operational efficiency and reduce operating costs, and/or increase the amount of moisture which can be efficiently removed from the sludgelike material.

In one known apparatus, as disclosed in German Gebrauchsmuster No. G9100341.5, the sludge drying apparatus is of the batch-type and utilizes a closable boxlike housing in which a wheeled hopper containing a batch of sludge can be positioned. The housing contains a refrigeration-type air drying apparatus which defines a closed recirculating air system for supplying dry air into the bottom of the hopper so that the air is fed upwardly through the sludge to remove moisture therefrom, with the wet air being dried and then resupplied to the drying apparatus for removing moisture therefrom. The air is contained in a closed recirculating system while permitting reasonably efficient removal of moisture therefrom, and hence removal of moisture from the sludge to permit drying thereof.

In the aforementioned apparatus, however, numerous structural and operational features are present which make both construction and use of this apparatus less than optimum. For example, the hopper has an operable front door to assist in removing the dried material when the hopper is removed from the apparatus, although it has been discovered that unloading of the material nevertheless still often requires manual shoveling of the material from the drying chamber for discharge through the front door. Further, in this known apparatus some of the dried material tends to fall through the perforated floor plate into the air supply chamber, and such material can be removed from the air supply chamber only by manually removing it through the air supply opening as formed in the back wall of the hopper. This known apparatus also lacks adequate controls for safe and automatic operation of the apparatus, and for example requires that the drying apparatus be defrosted by means of a manually-controlled switch.

Accordingly, it is an object of this invention to provide an improved batch-type drier, particularly for drying sludge such as filter cake, which improved drier overcomes many of the disadvantages associated with the drier described above.

More specifically, the improved drier includes a boxlike housing for receiving a hopper therein which contains a batch of wet sludge. The hopper cooperates with the housing, when closed therein, to define a closed air recirculation system which supplies dry pressurized warm air into a small air-receiving chamber located at the bottom of the hopper. The air passes upwardly through a perforated bottom wall into and through the sludge to remove moisture therefrom. The moist air passes upwardly through the open top of the hopper, through a filter and is supplied to a drying unit located in the housing for removing moisture therefrom, which moisture is externally discharged. The drying unit resupplies the dry air back to the drying chamber formed in the hopper. The air remains captivated and is recirculated to prevent escape of undesired volatiles, but significant moisture is nevertheless removed and externally discharged so as to permit efficient drying of the sludge without use of a separate heater.

In this improved drier, the sludge is deposited in the hopper through the upper top thereof, and is also discharge therefrom by tipping of the hopper after the sludge has been dried. For this purpose, the hopper has supporting structure associated with the bottom thereof for accommodating the tines or lifting elements of a conventional forklift truck. The supporting structure is normally rigidly coupled to the bottom of the hopper through a releasable latch. This supporting structure, when unlatched, permits relative vertical tilting of the hopper with respect to the supporting structure, which tilting is constrained to a limited angular extent by a restraining structure associated with the supporting structure. This arrangement enables the hopper containing the dried material to be attached to the lift fork and raised upwardly and then tilted over a receiving container so that the dried material can be dumped from the hopper through a discharge opening in the back wall thereof. This simultaneously permits any dried material which has fallen into the drying chamber to move toward and be discharged outwardly through the air supply opening so as to permit dumping of material from the drying chamber automatically and simultaneous with dumping of the material from the main drying chamber.

In this improved drier, as aforesaid, the perforated bottom wall of the drying chamber can be generally flat and spaced only a small distance from the bottom wall of the air supply chamber, thereby maximizing the capacity of the sludge-receiving drying chamber.

The improved drier, as aforesaid, also incorporates automatic controls which permit actuation of the overall apparatus only when the hopper is properly positioned and latched within the housing and the doors closed so as to then permit operation of the air recirculation and drying system. The drying system also incorporates an automatic defrost cycle and sensor which automatically initiates defrosting when such is required to hence optimize efficient operation of the system.

The improved drier, as aforesaid, also incorporates improvements in the air drying system to optimize the condensation of moisture from the air after passing through the hopper, and the efficient operation of the refrigeration part of the drying system.

Other desirable structural and operational features of the present invention will be apparent to persons familiar with structures of this general type upon reading the following specification and inspecting the accompanying drawings.

Figure 1:
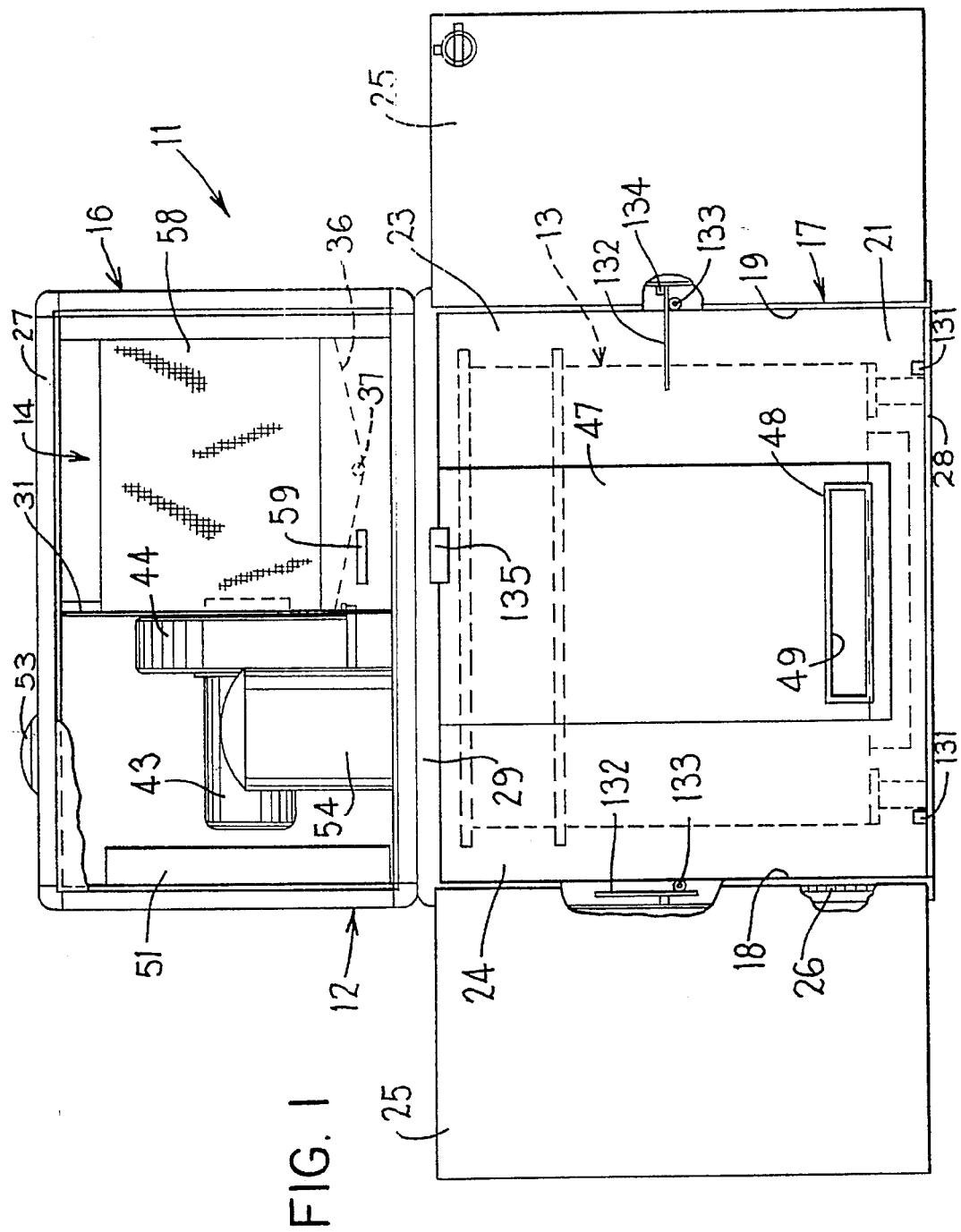
FIG. 1 is a front elevational view of the drier according to the present invention, and showing the upper front wall partially broken away and the doors in an open position.

Certain terminology will be used in the following description for convenience in reference only, and will not be limiting. For example, the words "upwardly", "downwardly", "rightwardly" and "leftwardly" will refer to directions in the drawings to which reference is made. The word "front" will refer to the side of the drier which is provided with doors and through which the hopper is moved, and the word "back" will refer to the opposite side of the drier. The words "inwardly" and "outwardly" will refer to directions toward and away from, respectively, the geometric center of the drier and designated parts thereof. Said terminology will include the words specifically mentioned, derivatives thereof, and words of similar import.

DETAILED DESCRIPTION

Figure 2:
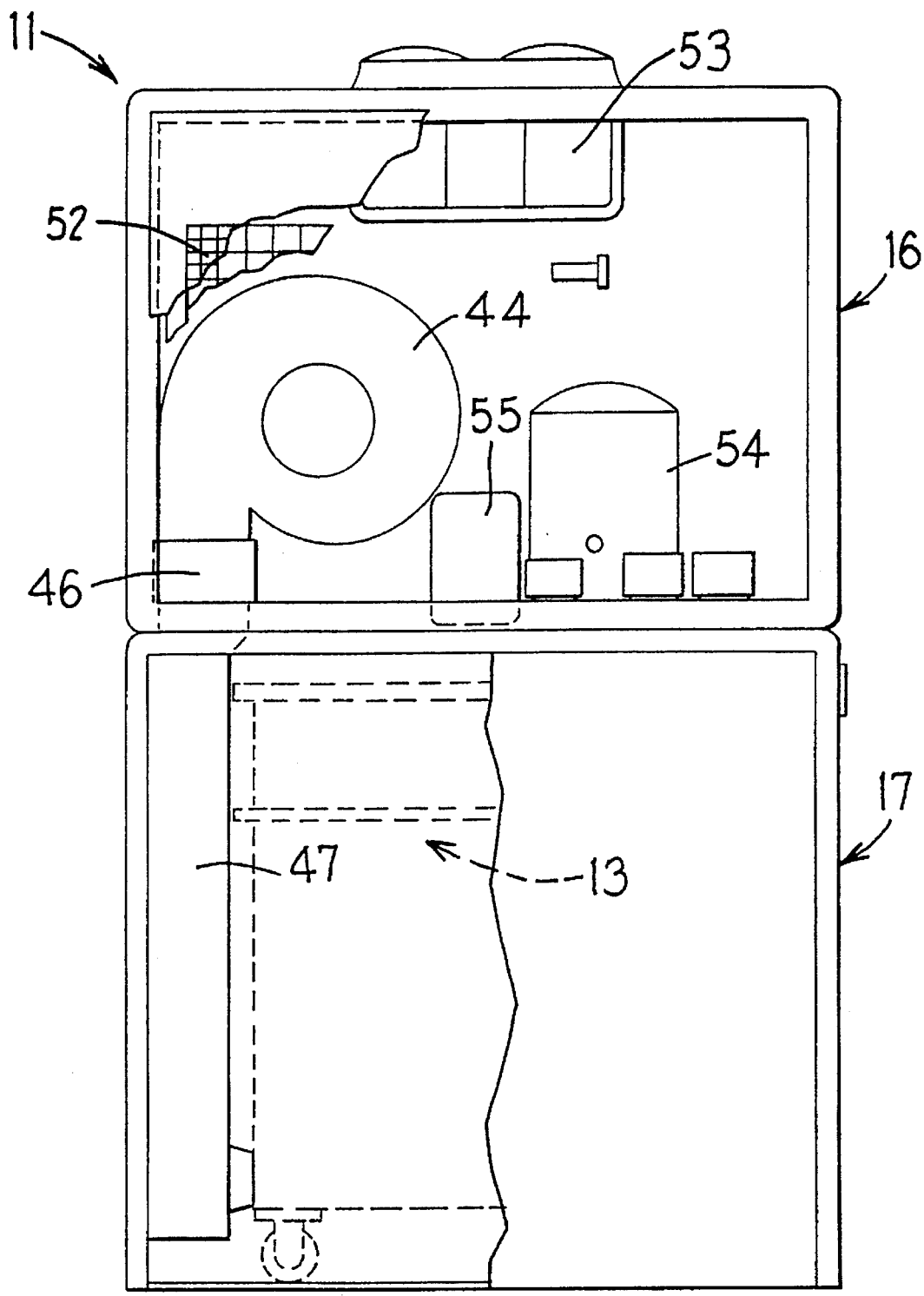
FIG. 2 is a left side elevational view with an upper portion of the side wall removed to show interior components.
Figure 3:
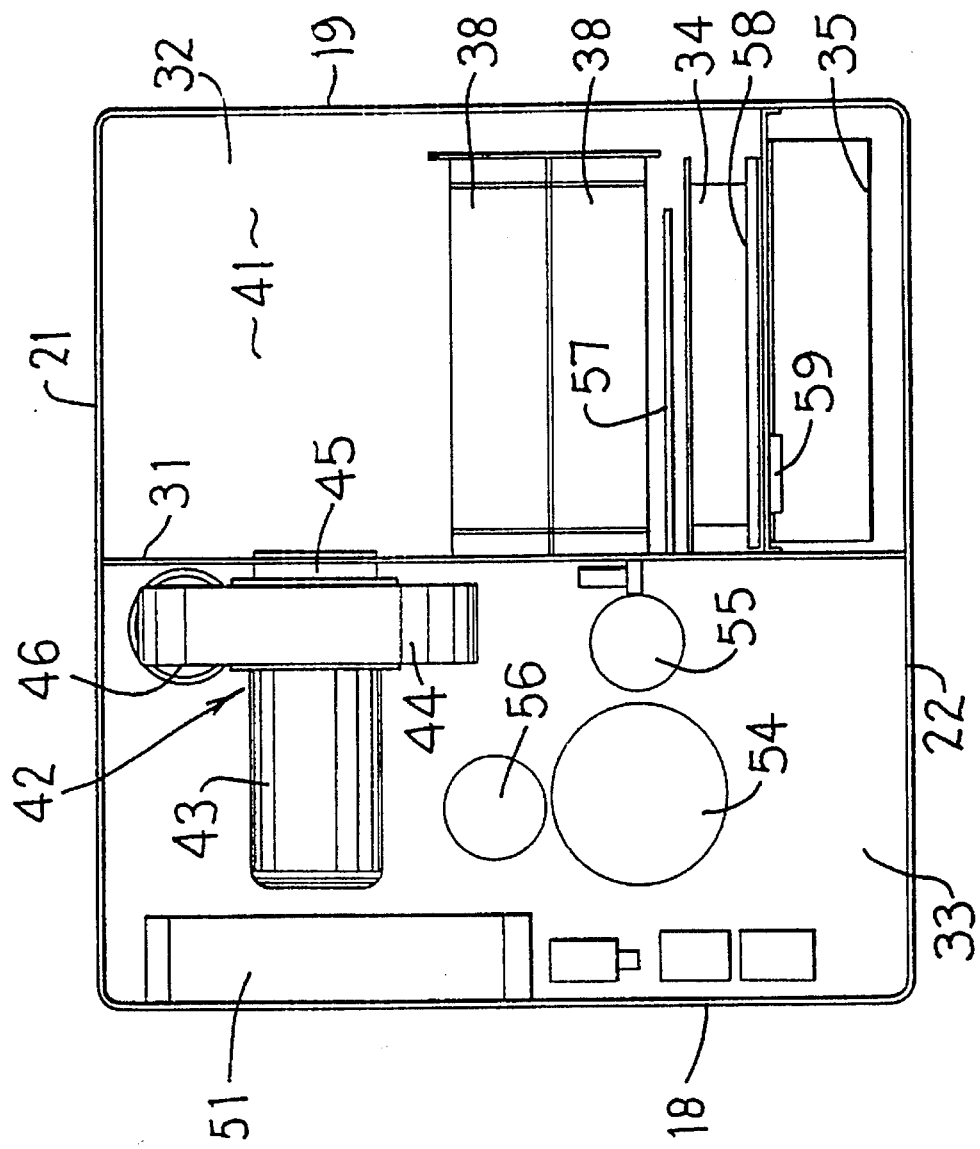
FIG. 3 is a top plan view with the top wall removed.

Referring to FIGS. 1–3, there is illustrated a batch-type drier 11 according to the present invention. This drier includes a generally hollow boxlike housing 12 adapted to have a roller-supported hopper 13 positioned therein, which hopper contains therein a batch of sludge. An air drying and circulating system 14 is associated with the housing, and is disposed primarily in the upper portion thereof, for circulating air through the hopper to remove moisture from the sludge, with the wet air being circulated back through the system 14 to effect removal of the water therefrom so that the dried air can then be resupplied to the hopper.

The housing 12 includes upper and lower housing portions 16 and 17, respectively, both of which are of a closed but hollow boxlike configuration. These housing portions 16 and 17 are of generally rectangular horizontal cross section and are defined by opposed and generally parallel upright side walls 18 and 19 which are rigidly joined by a back or rear wall 21. The upper housing portion 16 also has a front wall 22 which rigidly extends between the side walls and is generally parallel with the rear wall 21. The front side of the lower housing portion 16 defines an enlarged opening 23 which provides communication with an interior drying chamber 24 as defined within the lower housing portion 17. The opening 23 can be closed by a pair of doors 25 swingable about hinges 26 which couple the door edges to the housing adjacent the front edges of the opposite side walls. The doors can be closed and latched by a conventional handle and latch mechanism as provided on one or both doors. The doors, when closed, effectively seal off the interior drying chamber 24 from the surrounding environment.

The housing also includes top and bottom walls 27 and 28, respectively, which bottom wall is adapted to be positioned in supportive engagement with a floor or the like. A substantially horizontally extending intermediate wall 29 extends across the hollow interior of the housing substantially midway between the top and bottom walls thereof so as to effectively close off the drying chamber 24 defined in the lower housing portion 17 and thus separate it from the interior of the upper housing portion 16.

The upper housing portion 16 has a vertical divider wall 31 which fixedly extends between the top and intermediate walls, and the opposed side walls, and divides the interior of housing portion 16 into first and second side-by-side compartments 32 and 33, respectively. The first compartment 32 functions as a wet air chamber, whereas the second compartment 33 is an ambient air chamber. Different parts or components of the air drying and circulation system 14 are disposed in these chambers 32 and 33, as described below.

Positioned within the first chamber 32, as indicated by FIG. 2, is a coil-type evaporator 34 which is positioned adjacent but spaced slightly rearwardly from the front wall of the housing. This evaporator extends transversely across the chamber 32, and the coils thereof are provided with fins to improve heat transfer efficiency. In the region between the evaporator 34 and the front wall 22, there is provided an opening 35 formed in the intermediate wall 29 to provide communication with an upper part of the drying chamber 24. The moist air from drying chamber 24 passes upwardly through opening 35 into the upstream end of chamber 32 and thence through the evaporator 34 to effect condensation of much of the moisture carried by the air. The condensed moisture, namely water, collects in a generally V-shaped trough or reservoir 36 formed below the evaporator, and this reservoir communicates with a conduit 37 which provides discharge of the water to an external collecting device.

Positioned downstream of the evaporator 34, and disposed so as to extend transversely across the chamber 32, is a coil-type condenser 38, the latter including multiple coils positioned closely adjacent and in line with one another so that the air discharged from the evaporator 34 sequentially passes over the condenser coils. The air leaving the condenser 38 passes into a collection region or space 41 located at the rearward end of chamber 32, which region 41 communicates with the inlet of a fan or blower unit 42 as mounted in the ambient chamber 33.

The blower unit 42 (preferably a centrifugal compressor) includes a drive motor 43 which drives a conventional blower or fan wheel (not shown) as disposed within a shroud or housing 44, which housing 44 has an air inlet 45 which opens through the divider wall 31 for communication with the air in the collection region 41. The blower unit 42 has a pressurized air discharge 46 which connects to an opening in the intermediate wall 29 for direct communication with the upper end of an air duct 47 which is fixed to the rear wall 21 and projects vertically downwardly through the interior of the drying chamber 24. This duct 47, at its lower end as positioned close to but slightly above the floor of the housing, is provided with a ringlike rectangular collar 48 which projects forwardly a small extent and terminates in a large forwardly-directed discharge opening 49. This opening 49 is provided so as to discharge pressurized dry air into the bottom of the hopper 13 when the latter is positioned in the drying chamber 24, as explained hereinafter.

The ambient chamber 33 also has a further coil-type condenser 51 positioned therein, the latter being disposed closely adjacent and extending generally across an opening formed in the adjacent side wall 18, which opening is covered by a suitable grid or mesh 52. Ambient air can flow through this opening and across the condenser 51 into the chamber 33 whenever a suction fan 53 as mounted in the top wall 27 is activated. The suction fan 53 discharges outwardly through the top wall.

The ambient chamber 33 also mounts therein other components associated with the drying and circulating system 14 including, as illustrated in FIG. 3, a compressor 54 for the refrigerant used in the drying system, an accumulator 55 for refrigerant, and a storage or receiving tank 56 for refrigerant.

The system 14 also includes a portion of the refrigerant line formed into a serpentine heat exchanger 57 which is positioned within chamber 32 directly between the evaporator 34 and the condenser 38. This heat exchanger 57 extends transversely across the chamber so as to be contacted by the airstream as it flows from evaporator 34 to condenser 38.

Chamber 32 also has a humidistat 59 mounted therein upstream of the evaporator 32, which humidistat is preferably positioned in general alignment with and in close proximity to the communication opening 35 so as to sense the humidity of the air as it is discharged from the drying chamber 24.

Figure 4:
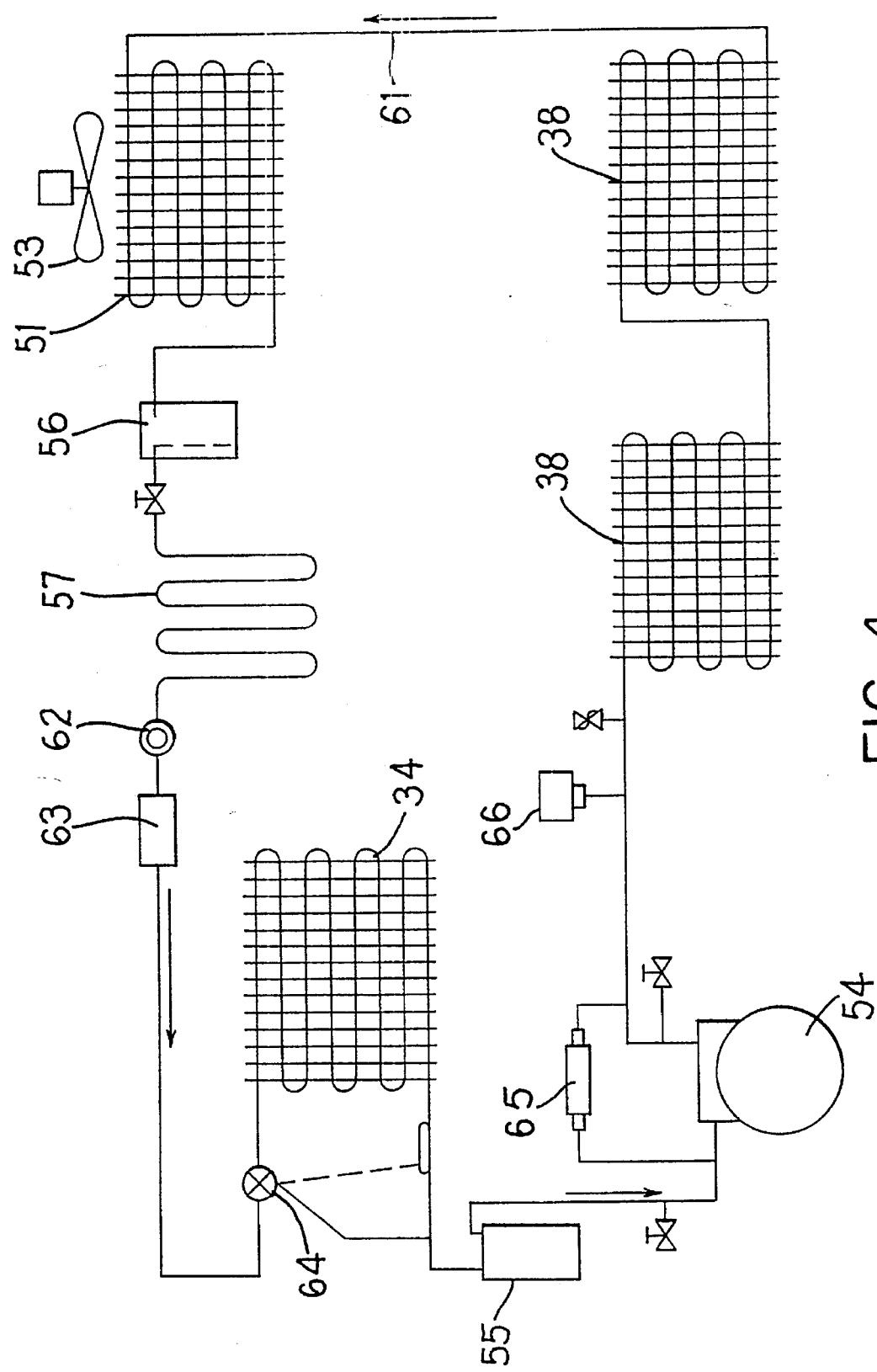
FIG. 4 is a diagram of the refrigeration system provided for drying the air.
Figure 6:
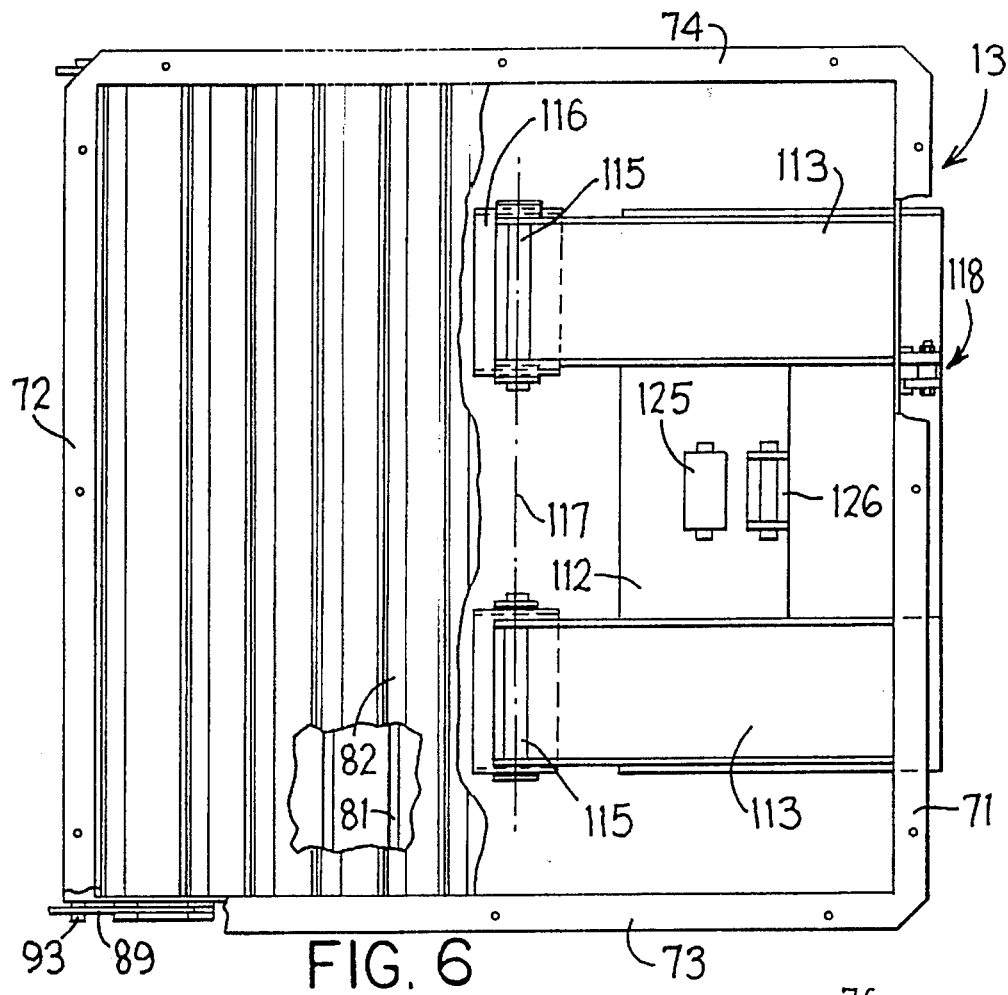
FIG. 6 is a fragmentary top view of the hopper.

The refrigeration cycle employed in the drying system 14, as diagrammatically illustrated by FIG. 4, includes a main line or conduit 61 through which the refrigerant passes and which couples the various components of the system so as to define a closed-loop arrangement. This conduit 61 includes portions thereof which are coiled in serpentine form so as to define the evaporator 34 and the condensers 38 and 51.

As indicated by FIG. 4, the refrigerant discharged from compressor 54 is initially supplied to the primary condenser 38 while the refrigerant is at its highest temperature, and thereafter passes through the secondary condenser 51. The refrigerant line 61 after leaving the secondary condenser is then coiled so as to create an auxiliary condenser or heat exchanger 57 which is positioned downstream of the evaporator 34. From this point the refrigerant line 61 has a refrigerant sight glass 62 and a refrigerant drier 63 coupled thereto. The refrigerant line then connects to an expansion valve 64 located just upstream of the evaporator 32. From the evaporator 34 the refrigerant is supplied to the accumulator 55 and thence back to the intake or low pressure side of the compressor 54. A pressure switch 65 is coupled between the input and output of the compressor for sensing the pressure differential and controlling operation of the compressor. Another refrigerant pressure switch 66 senses the pressure (and hence indirectly the temperature) of the refrigerant in the supply line to the condenser 38, which switch is activated to turn on the fan 53 and hence activate the secondary condenser 51 when the pressure sensed by switch 66 increases so as to indicate a warming of the refrigerant.

Considering now the structure of the hopper 13, and referring to FIGS. 5–8, hopper 13 has a generally upwardly-opening boxlike configuration in that it includes generally parallel upright front and rear walls 71 and 72 which are rigidly joined together by generally parallel side walls 73 and 74 which extend perpendicularly between the front and rear walls. The walls 71–74 are secured to and project upwardly with respect to a generally horizontally extending base wall 75. The top 76 of the hopper is open. The hopper defines therein a material-receiving chamber 77 which projects downwardly from the open top 76 and terminates at a floor 78. This floor 78 extend substantially horizontally across the hopper and is spaced upwardly from the bottom or base 75 by only a small distance, such as in the order of about five inches. This small vertical spacing between the base 75 and floor 78 defines an air-receiving chamber 79 which is located below the material-receiving chamber 77.

The floor 78 contains perforations which, in the illustrated embodiment, comprise narrow slots 81 which extend across the width of the floor to permit air to pass upwardly into the material contained in the chamber 77. The floor is also preferably provided with angled plates or deflectors 82 which slope upwardly over the slots 81 and project generally toward the rear wall of the hopper so as to minimize passage of solid material downwardly through the slots.

The hopper is provided with a pair of conventional cylindrical rollers 83 secured to the base adjacent the rear corners thereof, and similar swivel-type rollers or casters 84 are secured to the base adjacent the front corners of the hopper.

Figure 5:
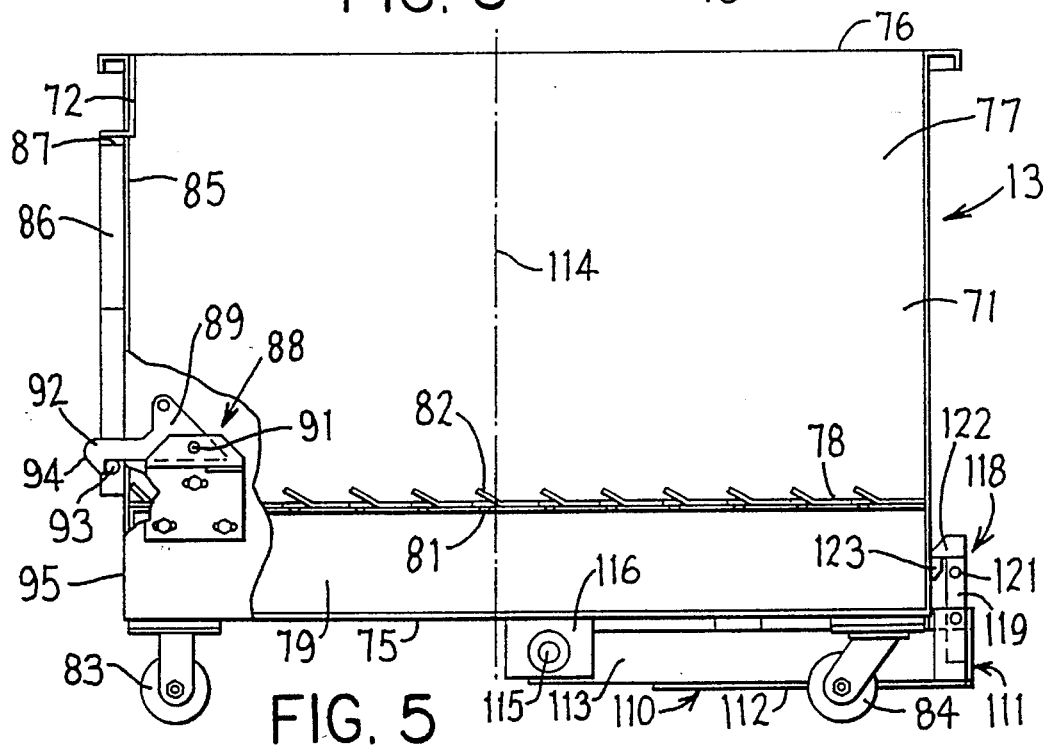
FIG. 5 is a side view of the hopper or hopper.
Figure 7:
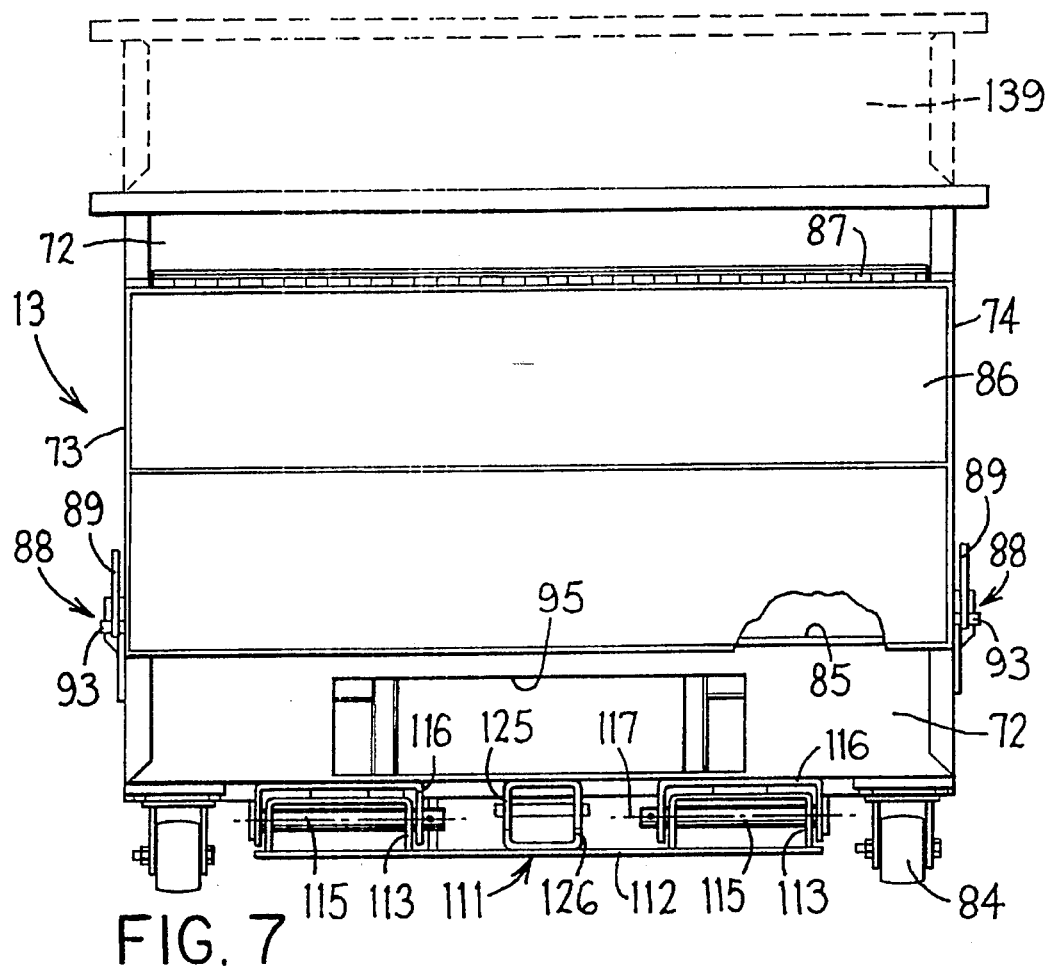
FIG. 7 is a rear elevational view of the hopper.

The rear wall 72 of the hopper has a large discharge opening 85 formed therein, which discharge opening extends across substantially the full width of the hopper and has a lower edge defined in close proximity to the elevation of the slotted floor 78. A door 86 is secured by a horizontal hinge 87 along its upper edge to the rear wall 72 at a location spaced a small distance downwardly from the top edge of the hopper. This door 86 is positioned to overlap the discharge opening 85 by abutting the rear wall so as to close off the discharge opening. To hold the door 86 in a closed position, manually releasable latches 88 are provided adjacent the lower corners of the door. Each latch 88 includes a latch lever 89 which is positioned adjacent the respective side wall 73 or 74 and is hingedly supported therein by a hinge pin 91. The latch lever 89, adjacent the free end thereof, is provided with a latching hook 92 which projects outwardly and is gravity-urged downwardly for latching engagement with a stublike latch pin 93 which is fixed to and projects sidewardly from the adjacent lower corner of the door 86. The latch 88, when engaged as illustrated by FIG. 5, prevents opening of the door 86 and permits such opening only after the latch has been manually released by swinging the latch hook counterclockwise about the pivot 91. The free end of the latching hook 92 is provided with a camming surface 94 thereon which is engaged by the latch pin 93 when the door swings toward its closed position so that the latch pin cammingly engages the latch lever and swings it upwardly to enable full closure of the door, following which the latch lever swings downwardly by gravity to latchingly engage the latch pin.

Figure 8:
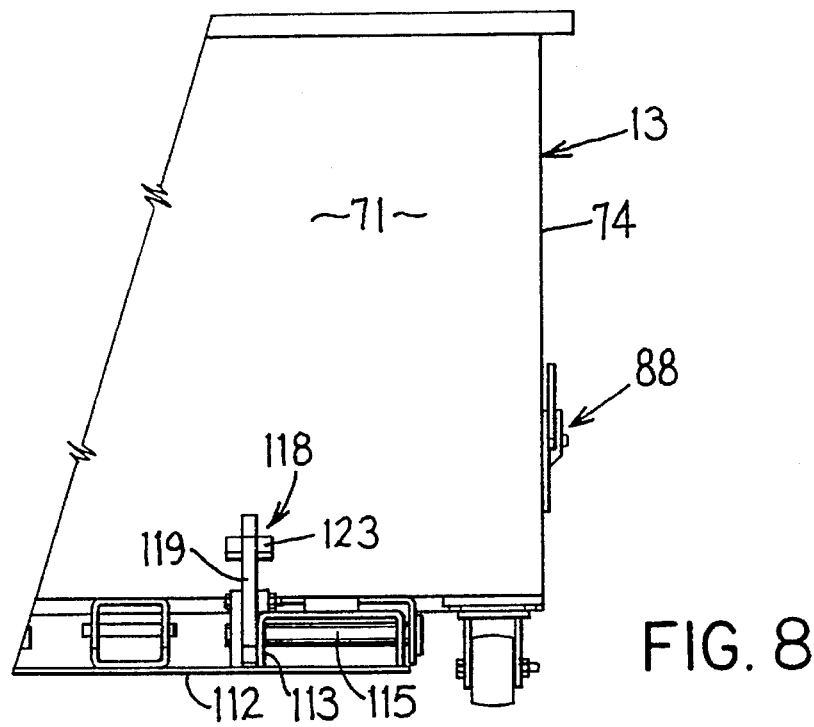
FIG. 8 is fragmentary front elevational view of the hopper.

The rear wall 72 of the hopper also has an air inlet opening 95 formed therethrough for direct communication with the air chamber 79. This air inlet opening 95 is positioned below the material discharge opening 85, as indicated by FIG. 8, and is adapted to substantially align with and directly communicate with the air discharge opening 49 defined at the bottom of the air supply duct 47. Air inlet opening 95 also functions to permit discharge of dried material which falls into the air chamber 79, as explained hereinafter.

To facilitate handling and emptying of the hopper 13 when it is removed from the drier, the hopper is provided with a lifting and tilting structure 110 secured to the underside thereof. This structure 110 includes a pivotal support platform 111 positioned under the base wall and defined by a generally horizontally extending base plate 112 having a pair of generally parallel channels 113 fixedly secured thereto in sidewardly spaced relationship. The channels 113 are secured in inverted fashion to the upper side of the base plate 112 to define a pair of generally parallel and sidewardly space tunnels which project under the hopper, with the sideward spacing of these tunnels corresponding to the conventional sideward spacing between the two tines associated with a conventional lift fork of a lift truck.

The channels 113, adjacent the ends thereof which are disposed in close proximity to the front side of the hopper, are also rigidly secured by a cross plate which extends between and is joined to the upper surfaces thereof. This cross plate also supportingly abuts the underside of the hopper when in the normal stored and latched position illustrated by FIG. 5. The inner or rearward ends of the channels 113 terminate close to the central vertical plane 114 of the hopper and are pivotally coupled to the hopper by hinge pins 115 which couple to brackets 116 secured to the underside of the hopper bottom wall. These hinge pins define a substantially horizontal hinge axis 117 which projects sidewardly of the hopper in generally parallel relationship to the front and rear walls thereof, and is spaced a small distance forwardly from the central vertical plane 114. This hinge axis 117 is disposed on the opposite side of the vertical plane 114 from the discharge opening 85, which results in this hinge axis being positioned horizontally on the opposite side of the center of gravity of the hopper relative to the discharge opening.

To rigidly and non-swingably secure the platform 11 to the hopper, there is provided a latch arrangement 118 which is disposed adjacent the front lower edge of the hopper for cooperation with the platform. This latch arrangement includes a latch lever 119 which is pivotally mounted about a pivot 121 to the front end of the platform. This latch lever has a hook 122 on the upper end thereof adapted for latching engagement with a shoulder 123 which is fixed to the front wall of the hopper. The latch lever 119 is gravity urged into the latched position illustrated, with the latch being manually swingable for permitting release thereof.

Figure 9:
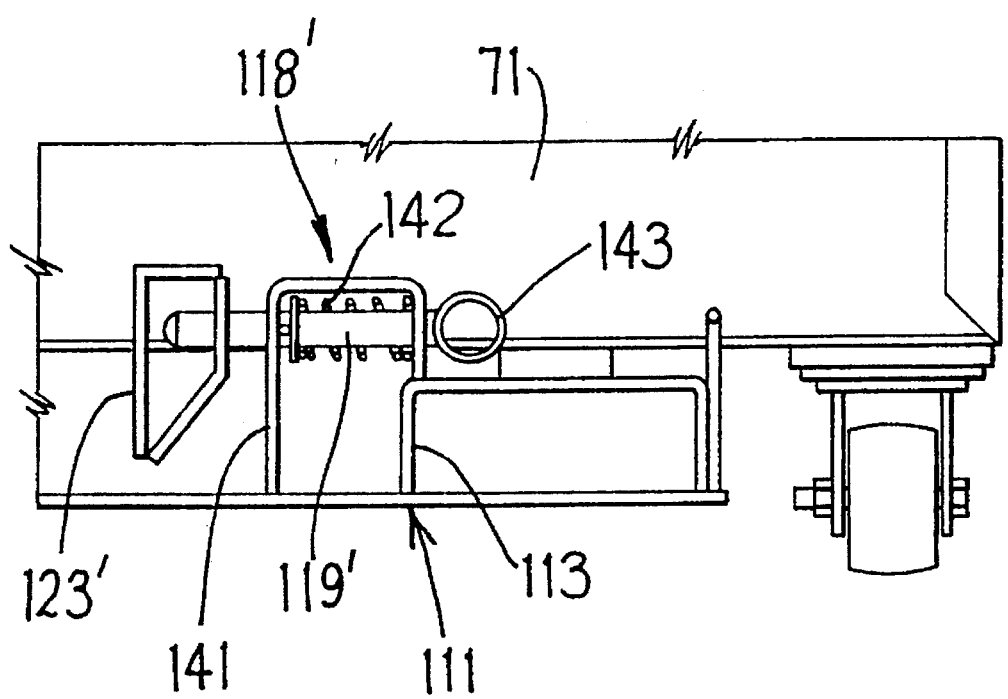
FIG. 9 is a fragmentary front view similar to FIG. 8 but illustrating a modified but preferred variation of the latch between the hopper and tilt structures.

Referring now to FIG. 9, there is illustrated a preferred variation of the latch structure 118' for fixedly but releasably securing the platform 112 to the hopper 13. This modified latch 118' includes a latch member 119' formed as an elongate pin and slidably supported on a bracket 141 fixed to one of the channels 113 adjacent the front wall of the hopper. This pin 119' is slidably urged, as by a spring 142 which concentrically surrounds the latch pin, toward a latching position wherein the projecting free end of the latch pin projects through an opening formed in a latch stop or abutment 123' which is fixedly secured to the front wall 71 of the hopper adjacent the lower edge thereof. The latch pin has a loop 143 secured to the other end thereof, which loop in turn has a pull cable or rope (not shown) connected thereto so that an operator can axially pull the latch pin outwardly (rightwardly in FIG. 9) to disengage the latch pin from the abutment and hence release the hopper for pivotal movement relative to the support platform.

The platform 111 is also interconnected to the hopper by a restraining structure for permitting vertical pivotal movement of the platform 111 relative to the hopper 13 through only a small angular extent, which angular extent is preferably a maximum in the range of about 35° to about 45°. This restraining structure includes an elongate flexible restraining element 124, such as a heavy cable (i.e. a nylon strap) or chain. This restraining element 124 has one end thereof coupled to a bracket 125 secured to the underside of the hopper, and the other end coupled to a further bracket 126 which is secured to the platform 111 intermediate the ends thereof. This restraining element 124 limits relative pivotal movement between the hopper and platform to a maximum angle as diagrammatically illustrated by FIG. 10.

Figure 10:
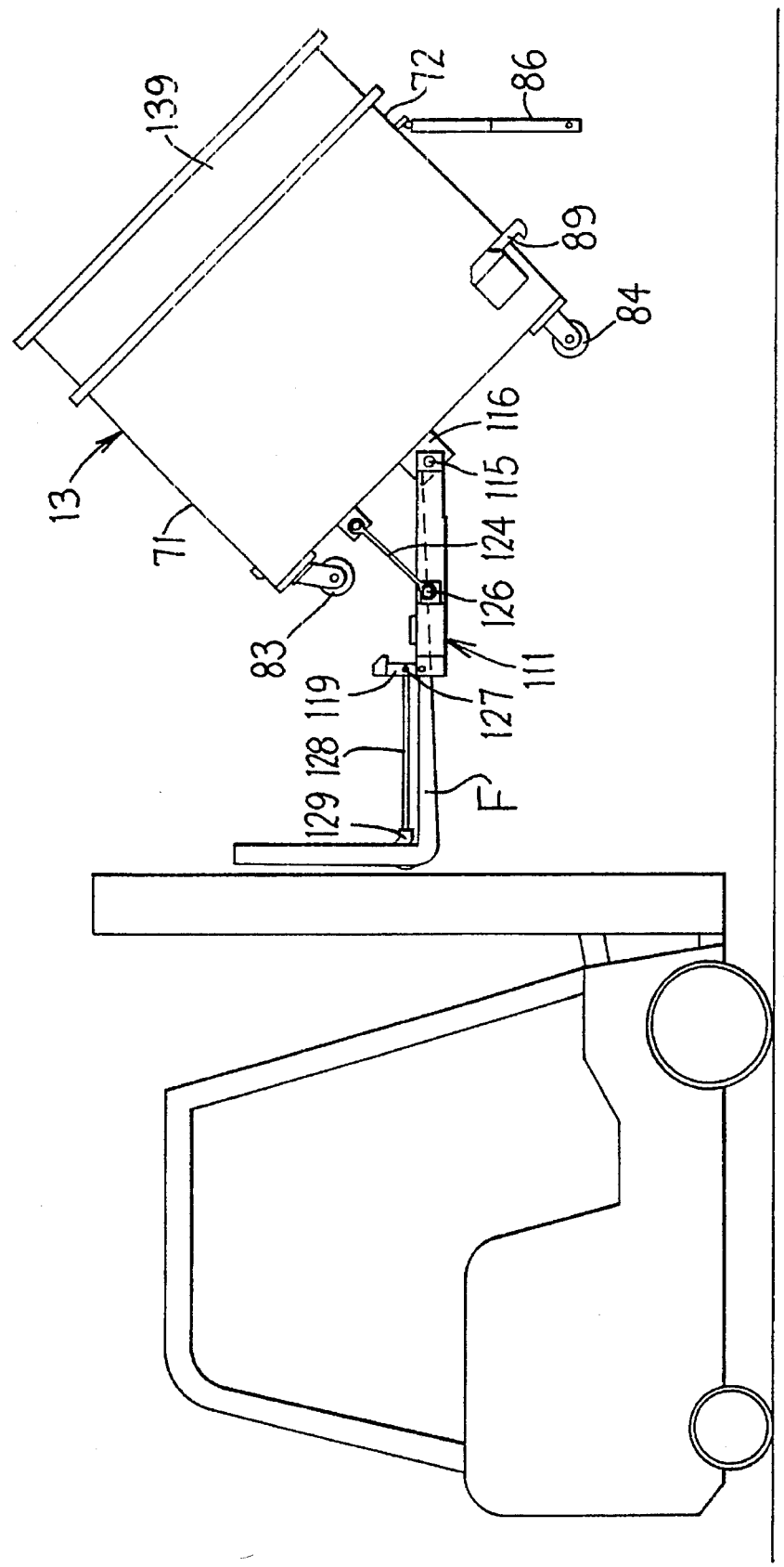
FIG. 10 illustrates the mounting and dumping of the hopper by a forklift.

To secure the platform 111 to a forklift truck when transporting or emptying of the hopper is desired, the hopper 13 also is provided with an anchoring structure for connection between the hopper and forklift. As illustrated by FIG. 10, there is provision for an elongate flexible anchoring element 128 such as a chain or cable, and one end of this anchoring element is secured to a fixed anchor 127 provided on the outer or front end of the platform 111 substantially at the midpoint thereof. The other end of this flexible anchor element 128 has a conventional hook or fastener 129 thereon and this latter anchor is used to engage one of the transverse support elements which is conventionally provided on and extends between the vertical supports of the forklift arrangement F.

To facilitate proper and safe operation of the drier of the present invention, the bottom wall of the drier is provided with a pair of generally parallel and sidewardly spaced guide rails 131 fixed to and projecting upwardly therefrom, which guide rails projects in the front-to-back direction so as to closely confine and guide the hopper support rollers therebetween. This ensures that the hopper is properly aligned when moved into the drying chamber so as to ensure that the air discharge on the rear duct is properly aligned with the air inlet defined in the rear wall of the hopper.

Further, when the hopper 13 is positioned in the drying chamber 24, it is moved rearwardly until the collar 48 defining the air discharge opening 49 substantially abuts the rear wall 72 of the hopper, thereby ensuring proper communication of the openings 49 and 95. This is further ensured by the provision of the hopper positioning latches 132 as provided on the front side of the housing directly inside the doors 25. These latches 132 are positioned adjacent the opposite front edges of the housing and are supported thereon by pivots 133, and are accessible only when the doors are open. The latch levers are normally stored in an upright position when the hopper is moved into or out of the drying chamber. After the hopper has been moved into the drying chamber, then these latch levers 132 are manually swung downwardly into a generally horizontal position, as limited by stops 134, so that the latch levers project over and are positioned closely adjacent the front wall of the hopper. These latch levers prevent outward movement of the hopper relative to the drying chamber. Further, these latch levers can be pivotally swung downwardly into the latching position only if the hopper is properly positioned in the drying chamber so as to ensure that the inlet opening 95 in the hopper is substantially abuttingly engaged with the outlet opening 49 in the air supply duct 47.

The drier 11 is also provided with a safety switch 135 mounted on the housing, specifically on one of the fixed frame elements closely adjacent the upper edge of the door opening. This safety switch is deactivated whenever the doors are open, and is contacted by the door and activated only when the door is closed. This safety switch, when activated, permits the drying cycle to be initiated.

The drier is provided with a control panel (not shown) thereon for access and visual observation by an operator. This control panel preferably includes a three-position selector switch which includes an "off" position, a "manual" position for permitting manual control over the cyclic operation, and an "auto" position for permitting automatic preset control of the drying cycle. The control panel also preferably includes a programmable timer which permits setting of a predetermined cycle time and which shows elapsed cycle time, a programmable humidistat which permit setting of the predetermined dryness of the sludge for terminating the end of an automated drying cycle, and a conventional manually-operated "start" switch.

The control selection for the drying cycle involves the operator activating the selector switch to select the "manual" mode, then setting the timer for the desired length of time of the drying cycle (for example, 20 hours), and then activating the "start" switch. The timer shuts off the machine when its time is out.

Alternately, if the operator selects the "auto" mode, then the operator adjusts the humidistat control to select the desired final moisture or humidity of the sludge (for example, 20% relative humidity), and thereafter activates the "start" switch. The machine will continue to run until the humidity of the wet air, as sensed by the humidistat, reaches the preset value, at which time the machine shuts off.

Operation:

The operation of the drier according to the present invention will now be briefly described to ensure a complete understanding thereof.

To initiate a drying operation, a load of wet sludge (i.e. filter cake) is positioned within the chamber 77 of the hopper 13, and the hopper is then rollingly moved into the drying chamber 24, preferably with the assistance of a forklift truck. When the hopper is positioned so that the duct outlet 49 is aligned with the air inlet opening 95 formed in the lower portion of the hopper rear wall, then an operator swings the latch levers 132 downwardly to overlap the front wall of the hopper, and then closes the doors 25 which activates the safety switch 135 so that the drier is thus in a position to be operated.

The operator then pushes or activates the manual start switch (not shown) which activates the air drying and circulating system 14.

The blower unit 42 is activated which discharges pressurized, dry warm air into the duct 47 where it is discharged through the opening 49 into the air chamber 79 defined at the bottom of the hopper. The air in chamber 79 then flows upwardly through slots 81 and upwardly through the wet sludge. Since the sludge is wet and at a temperature below that of the air, the air flowing upwardly through the sludge effects vaporization of moisture from the sludge so as to cause partial drying and warming of the sludge, with the moist but now cooler air flowing upwardly through the open top of the hopper so as to be sucked upwardly through the opening 35 into the front portion of the wet air chamber 32. At this location, the humidistat 59 senses the humidity of the wet air leaving the sludge. The wet air then flows horizontally rearwardly of the wet air chamber 32 and, in doing so, first passes through the air filter 58 and evaporator 34, then over the heat exchanger 57, and then through the condenser 38 into the collection space 41. In passing over the evaporator 34, the moisture in the air condenses on the coils so as to effect drying and cooling of the air, and simultaneously the latent heat of condensation is released and hence effects warming of the refrigerant as it flows through the evaporator. The dry air then passes over the condenser 38 and is heated. The air reaching the collection space 41 is thus warmer and drier then the air entering the wet air chamber 32 through the inlet opening 35. The air in space 41 is then sucked into the inlet 45 of the blower unit 42 which pressurizes the air and resupplies it back into the duct 47 for recirculation.

The moisture which condenses on the coils of the evaporator 34 flows downwardly and collects in the water collection trough or reservoir 36 for discharging externally of the drier.

In operation of the drier as briefly summarized above, the compressor 54 is energized and initially supplies the refrigerant through the line 61 to the coils of the main condenser 38, with the refrigerant thereafter being supplied to the secondary condenser 51. The refrigerant leaving the secondary condenser 51 then flows through the auxiliary condenser or heat exchanger 57, and then passes through the expansion valve 64 so as to be supplied into and through the evaporator 34 and then back to the compressor.

During the initial phase of the drying cycle, the sludge is of lowest temperature and highest moisture content, and during this initial phase of operation the refrigerant tends to remain at a lower temperature and pressure, and effective heat exchange across solely the main condenser 38 is sufficient to maintain proper operation of the system. However, during the later phase of the drying cycle, due to gradual warming of the sludge and reduction in the moisture content, the air supplied to the wet air chamber 32 is of slightly higher temperature and less moisture content, and the condenser 38 may by itself be insufficient to maintain the refrigerant at desired temperature and pressure. Thus, if the pressure in the refrigerant line 61 reaches a predetermined maximum so as to indicate a predetermined maximum refrigerant temperature, then the switch 66 activates the fan 53 which sucks warmer ambient air through the grid or opening 52 and across the condenser 51 which causes condensation of the refrigerant and removal of heat from the refrigerant so as to cause additional cooling thereof to maintain the refrigerant at the desired operating pressure and temperature. This secondary condenser 51 is activated, namely activated by the pressure switch 66 activating the fan 53, only as necessary when demanded by the refrigerant temperature in the system so as to maintain proper operation. During a majority of the drying cycle, the secondary condenser 51 is not activated.

Further, if the condensation deposited on the evaporator 34 creates a frost or freezing problem, then such will be sensed by a reduction in the pressure between the inlet and outlet to the compressor 54, as sensed by the pressure switch 65. When this switch 65 senses a minimal pressure differential, then the switch shuts off the compressor 54 to allow the air flow over the evaporator to melt the frost or ice. The compressor 54 will restart when the pressure switch 65 senses that the refrigerant temperature has again exceeded a predetermined minimum.

The provision of the auxiliary condenser coil 57 in the system, and particularly its connection in the refrigerant pipe 61 directly upstream of the evaporator 34 with respect to refrigerant flow, but its position downstream of the evaporator 34 with respect to airflow, is highly desirable for providing increased refrigerating effect in the system. This coil 57, due to its physical position for contact with the cold air directly downstream of the evaporator 34, functions to cool the liquid refrigerant within the line 61 at a location directly upstream of the expansion valve 64. This provides increased cooling of the refrigerant and improves the overall efficiency of the system, and at the same time reduces and limits the amount of time that the auxiliary fan 53 of secondary condenser 51 must be activated.

While the overall drying cycle will require a significant numbers of hours, nevertheless such drying is effective in highly reducing the moisture content of the sludge, and for example can result in the dried sludge having a density which is a small fraction of the density of the initial wet sludge. Since disposal costs are often associated with weight, the ultimate cost of disposing of the dry sludge is significantly reduced.

After the drying cycle has been completed, the doors of the housing are opened, the latch levers 132 swung upwardly, and the hopper 13 removed from the drying chamber.

To assist in removal of the hopper, a conventional forklift can be utilized. The forklift can be positioned so that the fork F is positioned in a lowered position close to the ground so that the pair of forwardly projecting fork elements project forwardly and are aligned with the tunnels defined by the channels 113. The fork elements can then be inserted into the tunnels until the ends thereof substantially abut the hinge pins 115. At such time the aforementioned provision allows the flexible anchor element 128 is then stretched rearwardly and the hook 129 thereof engaged over the transverse support on the fork mechanism. The lift truck can then move rearwardly and pull the hopper 13 out of the housing. The fork mechanism can then be raised a small extent so as to raise the hopper upwardly, following which the hopper can be transported to a desired location for dumping, such as to a collecting bin.

When dumping of the hopper is desired, the hopper can be elevated to a desired elevation so that the rear portion of the hopper is positioned over a collecting bin. The door latches 88 are manually released so as to permit opening of the discharge door 86. Thereafter the latch 118 or 118' is manually released. For this purpose, the latch member 119 or 119' is normally provided with a pull cable (not shown) attached thereto so as to permit an operator to release the latch 118 or 118' while remaining somewhat spaced from the hopper. As soon as this latch 118 or 118' is released, then the hopper immediately pivots into a dumping position (see FIG. 10) about the hinge axis 117 due to the latter axis being disposed in spaced relationship and forwardly from the central vertical plane 114 of the hopper. The hopper pivots about axis 117 into an orientation wherein the bottom wall is inclined at an angle of about 40° relative to the horizontal, such angle being restrained by the flexible restraining element 124 coupled between the bottom wall of the hopper and the support platform 111. Further, since the support platform 111 is preferably coupled to the forklift by the anchor element 128, the hopper can be prevented from falling off of the forklift. As the hopper pivots into the dumping position illustrated by FIG. 10, this also causes the rear door 86 to swing outwardly away from the rear wall 72 so as to hang in a downward pendant position, whereupon the dried material in the sludge chamber 77 slides downwardly along the floor 78 and is discharge outwardly through the rear discharge opening 85. Due to the manner in which the deflectors 82 angle upwardly over the slots 81 in the rearward direction, this tends to prevent the material from passing downwardly through the slots, and facilitates the rear discharge of the material through the rear opening 85.

Simultaneous with the discharge of material through the main discharge opening 85, any material which has fallen down into the drying chamber 79 also slides rearwardly on the floor 78 thereof due to the inclination of the floor, with the material in the air chamber 79 being free to flow outwardly through the air inlet opening 95 which is disposed directly below the main discharge opening 85. This arrangement thus permits any material which accidentally collects in the air chamber 79 to be simultaneously discharged along with the material from the main sludge chamber 77.

After the hopper has been completely dumped, then the forklift is moved rearwardly away from the collecting bin, and the fork lowered until the rear wheels initially contact the floor. Further lowering of the forklift then result in the hopper being gradually pivoted downwardly so as to return to a horizontal position wherein all of the support wheels are again supported on the floor. When reaching this latter position, the rear discharge door 86 has automatically swung back to its closed position and, due to the action of the camming surfaces 94 on the latch pins 93, is effective in camming the latch levers 89 upwardly a sufficient extent to enable the latch pins 93 to pass under and re-engage the latching hooks 92. The latch 118 or 118' between the support platform 111 and the front wall of the hopper is also re-engaged at this time. This re-engagement may be caused by springs which cooperate with the latch lever 119 or 119', although the re-engagement is preferably assisted or positively checked by the operator to ensure that the latch 118 or 118' is properly engaged.

The hopper is then in position to receive a further load of wet sludge therein.

In the illustrated embodiment, the hopper is illustrated as having a rectangular ringlike collar or extension 139 provided on the upper end thereof. This collar or extension is fixedly secured, as by means of bolts, to the top of the hopper and permits provision of a hopper having an increased sludge chamber capacity. This collar is provided when a larger capacity drier is required, with the collar being removed if a smaller capacity drier is desired.

A typical cycle of operation associated with drying a load of wet sludge, after the hopper has been sealed in the drying chamber, will now be briefly described.

Sludge or filter cake in the hopper will initially be of high moisture content, such as about 85% humidity, and at a temperature of about 75° F. After the control system is activated and reaches a steady state operation after initial start-up, with steady state is reached in about five minutes, the pressurized air discharged into the bottom of the hopper will be at a temperature of about 110° F. As the air passes upwardly through the sludge, the air is cooled but at the same time picks up a large amount of moisture and hence is effectively saturated with moisture. The moist air entering the wet chamber 32 may be at a temperature of about 75° F., whereas the surface temperature of the evaporator coil 34 may be about 32° F. The moist air in passing over the evaporator condenses on the coil and the latent heat of condensation released by the moisture significantly increases the temperature of refrigerant leaving the evaporator and effects cooling of the air, so that the air leaving the evaporator may be about 60° F. This cool air then immediately passes over the heat exchanger or auxiliary condenser coil 57, and the refrigerant within this coil is of a significantly higher temperature, such as about 80°, and hence the air effects cooling of the refrigerant to ensure that the refrigerant is liquified prior to its being resupplied to the expansion valve 64. The air then passes over the coils of the condenser 38, which coils may have a surface temperature of about 115°. The air is significantly heated so that the air leaving the condenser 38 is at a temperature of about 110° F., which air is then resupplied to the fan unit 42.

After the drying cycle has been in effect for a significant period of time, such as in the order of about 16 hours, the relative humidity in the filter cake may have been reduced to about 50%, and the filter cake temperature increased to about 85°. While the air entering into the filter cake may still be in the order of 110° F., the air leaving the filter cake and passing to the evaporator coil is now at a higher temperature of about 87° F., and typically will have a somewhat reduced moisture content. Hence, somewhat reduced moisture condensation and heat transfer occurs across the evaporator 34 and the refrigerant temperature will begin to increase slightly. If the refrigerant temperature at the condenser coils 38 reaches about 120° as sensed by sensor 66, then the fan unit 53 is turned on so as to activate the secondary condenser 51. This fan unit 53 draws ambient air at a temperature of about 80° F. across the condenser 51 so as to reduce the surface temperature of the condenser 51 and reduce the temperature of the refrigerant therein back to an acceptable level. The fan 53 will be periodically activated only when control of maximum refrigerant temperature is necessary. It has been determined that this secondary condenser 51 will be activated only when the moisture content in the filter cake has been significantly reduced so that the air leaving the filter cake is of lower moisture content, such as occurs near the end of the drying cycle.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an apparatus for drying a wet sludgelike material, said apparatus including confinement means (13) for containing a batch of said material, and a system (14) for supplying air through said batch of material for drying the material, said system including an air inlet (35) and an air outlet (49) communicating with said confinement means, said system comprising:

a moist air chamber (32) communicating with said outlet (35) for receiving therein moist air;

fan means (42) for supplying pressurized dry air to said inlet (49), said fan means having an intake (45) in communication with said air chamber (32) at a location remote from said outlet (35);

refrigeration means associated with said air chamber (32) for drying and heating the air as it flows therethrough from said outlet to said intake;

said refrigeration means including conduit means (61) for containing a flowable refrigerant therein, said conduit means (61) defining a closed loop flow path connected to a compressor (54) for the refrigerant;

said conduit means (61) including a main condenser coil (38) connected in series with said compressor (54) downstream thereof, a heat exchanger coil (57) connected in series with said main condenser coil (38) downstream thereof, and an evaporator coil (34) connected in series with said heat exchanger coil (57) downstream thereof, said evaporator coil (34) being upstream of said compressor (54);

said evaporator and condenser coils (34,38) being disposed within and extending generally transversely across said air chamber (32) for contact with the air moving therethrough, said condenser coil (38) being positioned downstream of said evaporator coil (34) relative to the direction of air movement through said air chamber (32);

said heat exchanger coil (57) being disposed within and extending transversely across said air chamber (32) at a location between said evaporator and condenser coils relative to said air movement direction; and means (36) for collecting the water which condenses on the evaporator (34) for permitting discharge thereof.

2. An apparatus according to claim 1, wherein said conduit means (61) includes a secondary condenser coil (51) connected in series downstream of said main condenser coil (38) but upstream of said heat exchanger coil (57), said secondary condenser coil (51) being mounted outside of said air chamber (32) so as to be free of contact with the air which is recirculated through the sludgelike material, and auxiliary fan means (53) for causing flow of ambient air across said secondary condenser coil (51).

3. An apparatus according to claim 2, including control means (66) for intermittently activating said auxiliary fan means (53) in response to the refrigerant in the conduit means (61) exceeding a predetermined pressure or temperature.

4. An apparatus according to claim 2, including an ambient air chamber (33), said secondary condenser coil (51) and said fan means (42) being mounted in said ambient air chamber.

5. An apparatus for batch drying of wet bulk material, comprising:

a housing (12) defining therein a closed and substantially sealed drying chamber (24), said housing including a door (25) providing access to said drying chamber;

a hopper (13) positionable within said drying chamber, said hopper including a boxlike structure (71–74) adapted to contain therein a batch of wet material to be dried;

said boxlike structure including a bottom wall (75) and a generally tubular sidewall structure (71–74) fixed thereto and projecting upwardly therefrom, and an intermediate floor (78) extending across said sidewall structure at a small distance above said bottom wall (75) but downwardly a significant distance from an upper edge of said sidewall structure, said hopper defining therein a material-receiving chamber (77) disposed above said floor (78) and an air chamber (79) defined between said floor (78) and said bottom wall (75), said floor having a plurality of small openings (81) extending therethrough for permitting passage of air upwardly from said air chamber into said material-receiving chamber;

said sidewall structure including front and rear walls (71,72) rigidly joined together by left and right side walls (73,74), said rear wall (72) having a discharge opening (85) formed therein for direct communication with said material-receiving chamber (77), said rear wall also having an air supply opening (95) formed therethrough at a location below said discharge opening (85) for direct communication with said air chamber (79), and door means (86) movably mounted on said boxlike structure for normally closing said discharge opening (85);

said hopper also including a tilting structure (110) mounted to said boxlike structure for permitting lifting of the hopper by a forklift and vertical tilting of the hopper about a substantially horizontal tilt axis so that the rear wall of the hopper is vertically tilted downwardly to permit simultaneous gravity-discharge of material through both the discharge opening (85) and the air supply opening (95);

said hopper also including releasable latching means (118) cooperating between said boxlike structure and said tilting structure (110) for normally maintaining the tilting structure in a fixed and rigid relationship with respect to the boxlike structure;

an air recirculation system (14) provided on said housing and coupled to said drying chamber (24) for supplying dry pressurized air into the drying chamber and removing wet air from the drying chamber, said air circulation system including an air discharge opening (49) adjacent a lower rear portion of said chamber (24) for direct communication with the air supply opening (95) defined in the rear wall of the hopper;

said housing also defining therein a closed wet air chamber (32) which functions as part of the air recirculation system for receiving therein the wet air returned from the drying chamber (24); and said system also including refrigeration means having an evaporator (34) and a main condenser (38) positioned within said wet air chamber (32) for condensing the moisture from the air respectively.

6. An apparatus according to claim 5, wherein said wet air chamber (32) has an inlet (35) at one end thereof which communicates directly with the drying chamber (24) for permitting flow of wet air from the drying chamber through said inlet into said wet air chamber, said wet air chamber at the other end thereof communicating with an intake (45) to a fan unit (42) which recirculates the air through the system, said evaporator (34) and said condenser (38) being disposed in series in said wet air chamber (32) so that the wet air entering said one end thereof first flows across said evaporator (34) and then across said condenser (38) before being resupplied to said fan unit (42), and said refrigeration means including a refrigerant-containing heat transfer coil (57) positioned within said wet chamber (32) downstream of said evaporator (34) but upstream of said condenser (38) for heat transfer contact with the air flowing through said chamber (32), said heat transfer coil (57) having refrigerant flowing therethrough and the refrigerant inlet thereof coupled to the refrigerant outlet of the evaporator (34), whereby the air leaving the evaporator and passing over the heat transfer coil is effective for causing cooling of the refrigerant.

7. An apparatus according to claim 5, wherein the refrigeration means includes a secondary condenser (51) mounted on said housing so as to be free of contact with the recirculated air, said secondary condenser being exposed to ambient air, auxiliary fan means (53) for selectively moving ambient air through said secondary condenser (51) when additional cooling of the refrigerant is desired, and control means (66) for sensing refrigerant pressure or temperature and activating said auxiliary fan means (53) whenever the refrigerant pressure or temperature reaches a predetermined maximum.

8. An apparatus according to claim 7, wherein said wet air chamber (32) has an inlet (35) at one end thereof which communicates directly with the drying chamber (24) for permitting flow of wet air from the drying chamber through said inlet into said wet air chamber, said wet air chamber at the other end thereof communicating with an intake (45) to a fan unit (42) which recirculates the air through the system, said evaporator (34) and said condenser (38) being disposed in series in said wet air chamber (32) so that the wet air entering said one end thereof first flows across said evaporator (34) and then across said condenser (38) before being resupplied to said fan unit (42), and said refrigeration means including a refrigerant-containing heat transfer coil (57) positioned within said wet chamber (32) downstream of said evaporator (34) but upstream of said condenser (38) for heat transfer contact with the air flowing through said chamber (32), said heat transfer coil (57) having refrigerant flowing therethrough and the refrigerant inlet thereof coupled to the refrigerant outlet of the evaporator (34), whereby the air leaving the evaporator and passing over the heat transfer coil is effective for causing cooling of the refrigerant.

9. An apparatus according to claim 5, including control means (65) for sensing the refrigerant pressure and for shutting off the refrigeration means compressor (54) whenever a predetermined minimum temperature is sensed so as to permit automatic defrosting of the coil of the evaporator (34).

* * * * *